(No Model.) 2 Sheets—Sheet 1.
B. J. PAVYER & T. BURNS.
PAPER CUTTER.
No. 485,586. Patented Nov. 1, 1892.
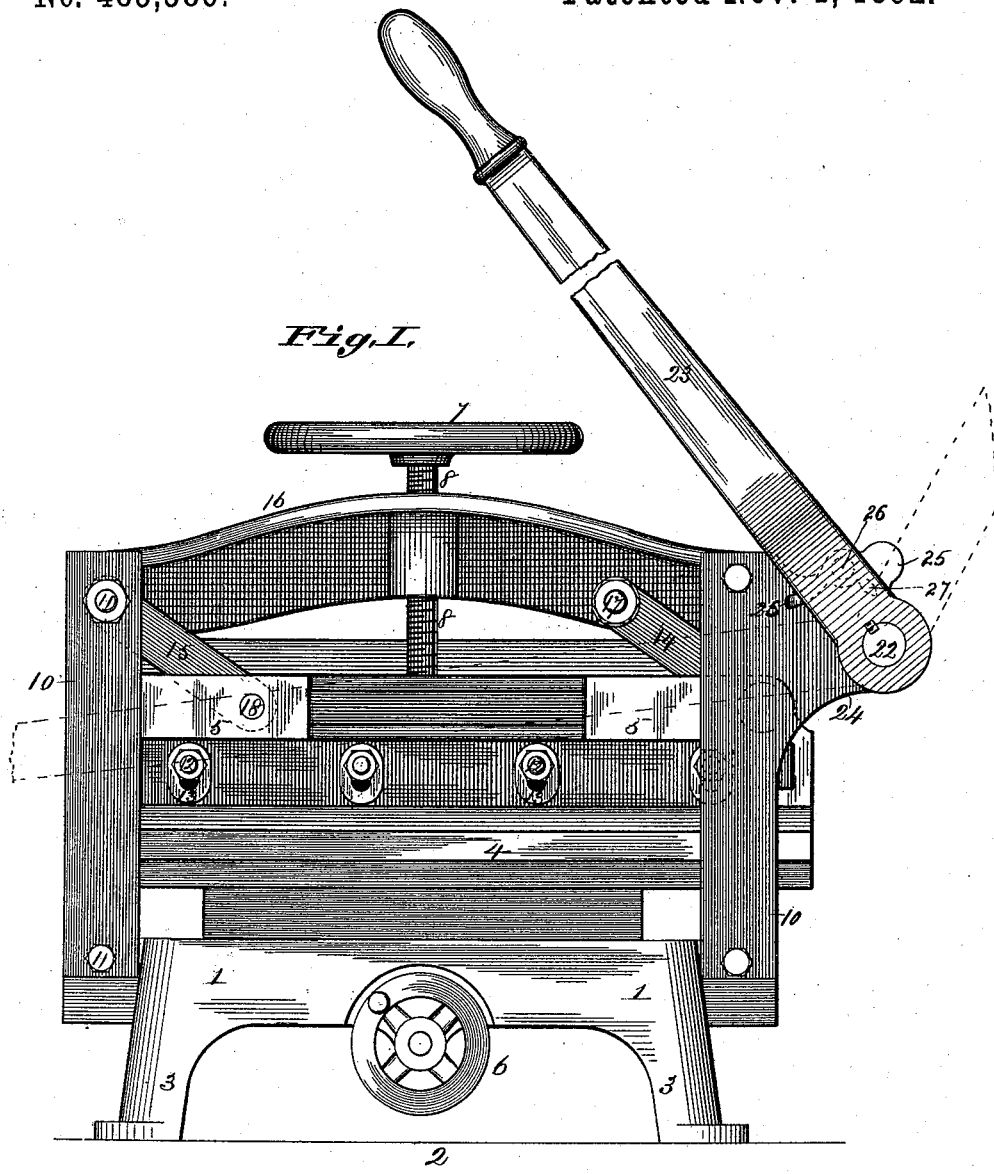
Fig. I.
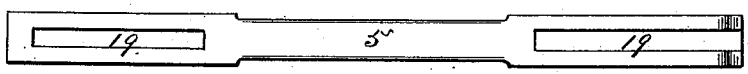
Fig. II.
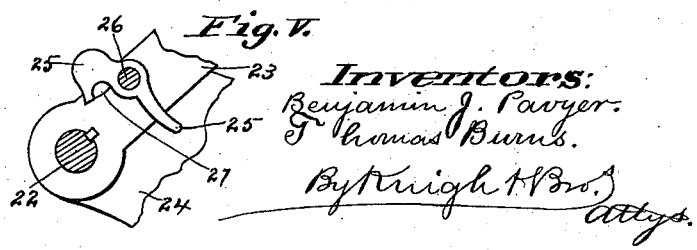
Fig. V.
Attest:
E. Z. Knight.
E. Arthur.
Inventors:
Benjamin J. Pavyer.
Thomas Burns.
By Knight Bro.
Attys.

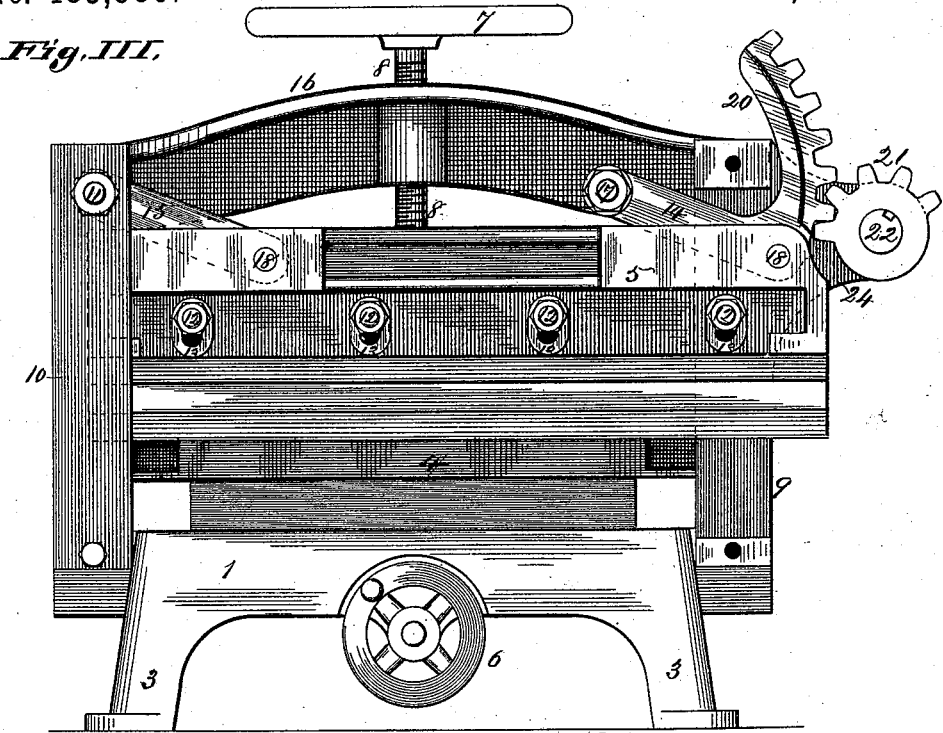
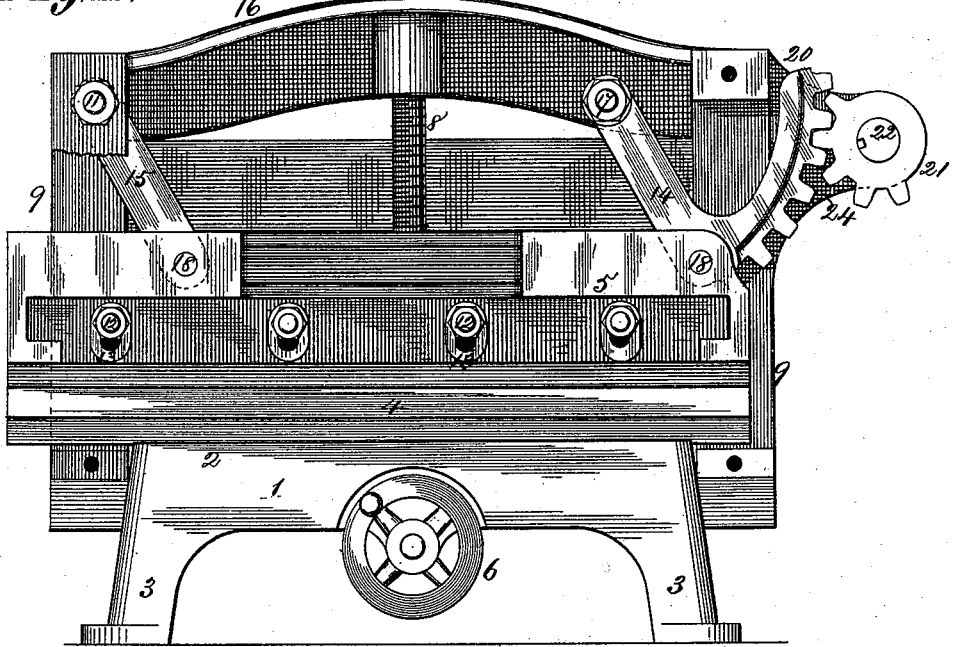

UNITED STATES PATENT OFFICE.

BENJAMIN J. PAVYER AND THOMAS BURNS, OF ST. LOUIS, MISSOURI; SAID BURNS ASSIGNOR TO SAID PAVYER.

PAPER-CUTTER.

SPECIFICATION forming part of Letters Patent No. 485,586, dated November 1, 1892.

Application filed July 7, 1890. Serial No. 357,948. (No model.)

*To all whom it may concern:*

Be it known that we, BENJAMIN J. PAVYER and THOMAS BURNS, both of the city of St. Louis, in the State of Missouri, have invented a certain new and useful Improvement in Paper-Cutters, of which the following is a full, clear, and exact description, reference being had to the accompanying drawings, forming part of this specification.

Our invention consists in novel features of construction hereinafter described, and pointed out in the claim.

In order that our invention may be fully understood, we will proceed to describe it with reference to the accompanying drawings, in which—

Figure I is a front elevation of the machine, showing the knife up. Fig. II is a top view of the knife frame or bar. Fig. III is a front elevation with part of the frame removed and the knife up; and Fig. IV is a similar view, except that the knife is shown down. Fig. V is a detail view showing the lever-retaining device.

The frame 1 is shown of a construction suiting it to stand on a table or bench 2; but the legs 3 may be increased in length, so that it may properly be stood upon the floor.

No novelty is claimed in the frame 1, knife 4, knife-frame 5, the gage or gage-wheel 6, nor in the paper-clamping device, whose actuating hand wheel and screw are seen at 7 8.

The ends of the knife-frame work between fixed guides 9 and removable guides 10, the latter being secured to the frame by bolts 11. The knife is secured to its frame by bolts 12, passing through slots 13. The knife-frame is supported on links 14 15, whose upper ends are connected to the frame and bridge 16 by pivot-bolts 11 and 17 and their lower end connected to the knife-frame by pivots 18. The lower ends of the links work in slots 19 of the frame. (See Fig. II.) Upon the link 14 is a cog-segment 20, with which engages a cog segment or wheel 21 upon the shaft 22 of the hand-lever 23. The lever and segment 21 are both made fast to the shaft. The shaft has bearing in the projections 24 of the main frame and the guide 10. (See Figs. I and III.) The curve of the segment 20 is of course concentric with the pivot 17 and the curve of the segment 21 is concentric with the shaft 22.

25 is a dog pivoted to the frame at 26 and adapted to engage a projection 27 on the lever 23 or shaft 22, and thus to keep the lever in its elevated position, except when the dog is disengaged.

We claim as our invention—

A paper-cutting machine comprising a knife-frame 5, having slots 19, the inner link 15, the outer link 14, formed with the upwardly-projecting cog-segment 20, the main frame having the projections 24, the shaft 22, journaled in the projections, the segment-wheel 21, keyed to the shaft and meshing with the cog-segment, and the lever 23, substantially as described.

BENJAMIN J. PAVYER.
THOMAS BURNS.

Witnesses:
SAML. KNIGHT,
BENJN. A. KNIGHT.